United States Patent
Kanda

(10) Patent No.: US 12,094,150 B2
(45) Date of Patent: Sep. 17, 2024

(54) CONTROL DEVICE, A TERMINAL, AND A CALCULATION METHOD CAPABLE OF CALCULATING A DIRECTION OF A CARGO CONVEYED BY A WORK MACHINE

(71) Applicant: TADANO LTD., Kagawa (JP)

(72) Inventor: Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 110 days.

(21) Appl. No.: 17/802,412

(22) PCT Filed: Mar. 8, 2021

(86) PCT No.: PCT/JP2021/008989
§ 371 (c)(1),
(2) Date: Aug. 25, 2022

(87) PCT Pub. No.: WO2021/182396
PCT Pub. Date: Sep. 16, 2021

(65) Prior Publication Data
US 2023/0087971 A1  Mar. 23, 2023

(30) Foreign Application Priority Data

Mar. 9, 2020 (JP) ................................ 2020-040141

(51) Int. Cl.
*G06T 7/66* (2017.01)
*B66C 13/46* (2006.01)
*G06T 7/00* (2017.01)

(52) U.S. Cl.
CPC ................ *G06T 7/66* (2017.01); *B66C 13/46* (2013.01); *G06T 7/0004* (2013.01)

(58) Field of Classification Search
CPC ......... G06T 7/66; G06T 7/0004; B66C 13/46; B66C 1/68
See application file for complete search history.

(56) References Cited

U.S. PATENT DOCUMENTS

| 8,363,410 B2 | 1/2013 | Kobori et al. |
| 2019/0055111 A1* | 2/2019 | Cranney, III ........... B66C 13/46 |

(Continued)

FOREIGN PATENT DOCUMENTS

| EP | 3351699 A1 | 7/2018 |
| JP | S62-004190 A | 1/1987 |

(Continued)

OTHER PUBLICATIONS

May 25, 2021, International Search Report issued for related PCT Application No. PCT/JP2021/008989.

(Continued)

*Primary Examiner* — Hongmin Fan
(74) *Attorney, Agent, or Firm* — Paratus Law Group, PLLC

(57) ABSTRACT

A control device equipped with a first acquisition unit for acquiring information pertaining to the location of the center of gravity of cargo transported by a work machine, a second acquisition unit for acquiring information pertaining to the location of a first section of the cargo which differs from the location of the center of gravity thereof, and a calculation unit for calculating information pertaining to the orientation of the cargo on the basis of the information pertaining to the location of the center of gravity of the cargo and the information pertaining to the location of the first section.

7 Claims, 7 Drawing Sheets

(56) References Cited

U.S. PATENT DOCUMENTS

| | | | | |
|---|---|---|---|---|
| 2020/0031632 A1* | 1/2020 | Hanahara | ................. | B66C 1/36 |
| 2020/0340208 A1* | 10/2020 | Kitajima | ................. | B66C 23/86 |
| 2021/0147194 A1* | 5/2021 | Kosaka | ................. | G06T 7/521 |
| 2022/0017335 A1* | 1/2022 | Sikora | ................. | B66C 13/105 |
| 2022/0332550 A1* | 10/2022 | Minami | ................. | B66C 13/46 |

FOREIGN PATENT DOCUMENTS

| | | |
|---|---|---|
| JP | 2009-107736 A | 5/2009 |
| JP | 2011-060496 A | 3/2011 |
| JP | 2018-095375 A | 6/2018 |

OTHER PUBLICATIONS

May 25, 2021, International Search Opinion issued for related PCT Application No. PCT/JP2021/008989.

Feb. 26, 2024, European Search Report issued for related EP Application No. 21768246.7.

\* cited by examiner

CONTROL DEVICE, A TERMINAL, AND A CALCULATION METHOD CAPABLE OF CALCULATING A DIRECTION OF A CARGO CONVEYED BY A WORK MACHINE

CROSS REFERENCE TO PRIOR APPLICATION

This application is a National Stage Patent Application of PCT International Patent Application No. PCT/JP2021/008989 (filed on Mar. 8, 2021) under 35 U.S.C. § 371, which claims priority to Japanese Patent Application No. 2020-040141 (filed on Mar. 9, 2020), which are all hereby incorporated by reference in their entirety.

TECHNICAL FIELD

The present invention relates to a control device, a terminal, and a calculation method.

BACKGROUND ART

Patent Literature 1 discloses, as an example of a work machine, a crane including a boom provided in a turnable manner and a hook suspended by a wire rope from a distal end portion of the boom.

In order for the crane to convey a cargo, an operator of the crane (hereinafter referred to as "crane operator") operates the boom to move the hook to a location where the cargo is temporarily placed.

An operator who performs sling work (hereinafter referred to as "sling operator") is on standby around the temporarily placed cargo. The sling operator performs sling work for attaching a sling tool (e.g., a sling wire rope) to the cargo. Thereafter, the crane operator conveys the cargo to a target location (e.g., an installation location).

CITATION LIST

Patent Literature

Patent Literature 1: JP 2011-60496 A

SUMMARY OF THE INVENTION

Problems to be Solved by the Invention

In the conveyance work using the crane as described above, it is important to know a direction of the cargo at the installation location, for example, in order to install the cargo in a correct direction.

An object of the present invention is to provide a control device, a terminal, and a calculation method capable of calculating a direction of a cargo conveyed by a work machine.

Solutions to Problems

According to an aspect of the present invention, a control device includes:
a first acquisition unit that acquires information pertaining to a location of the center of gravity of a cargo conveyed by a work machine;
a second acquisition unit that acquires information pertaining to a location of a first section different from the location of the center of gravity of the cargo; and
a calculation unit that calculates information pertaining to a direction of the cargo on the basis of the information pertaining to the location of the center of gravity of the cargo and the information pertaining to the location of the first section.

According to another aspect of the present invention, a terminal includes the above-described control device.

According to another aspect of the present invention, a calculation method performed in a terminal including a control device includes:
acquiring information pertaining to a location of the center of gravity of a cargo conveyed by a work machine;
acquiring information pertaining to a location of a first section different from the location of the center of gravity of the cargo; and
calculating information pertaining to a direction of the cargo on the basis of the information pertaining to the location of the center of gravity of the cargo and the information pertaining to the location of the first section.

Effects of the Invention

According to the present invention, it is possible to calculate a direction of a cargo conveyed by a work machine.

DESCRIPTION OF EMBODIMENTS

Hereinafter, some embodiments according to the present invention will be described in detail with reference to the drawings. Note that a control device 82, a terminal (a server 8 to be described later), and a calculation method according to the embodiments to be described later are examples of the control device, the terminal, and the calculation method according to the present invention, and the present invention is not limited to the embodiments to be described later.

Embodiment

Figure 1:
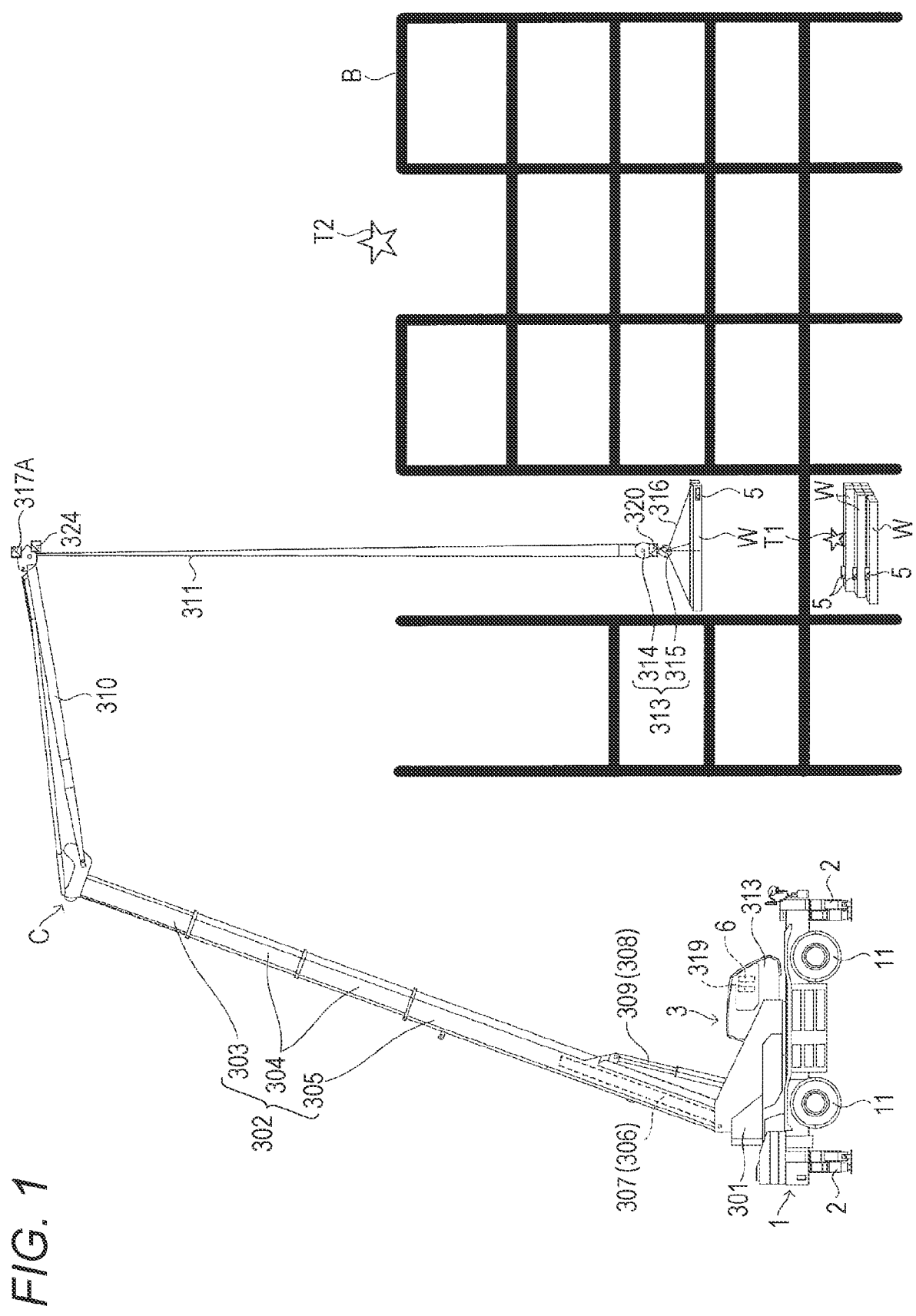
FIG. 1 is a diagram schematically illustrating a work site where a crane is disposed.
Figure 2:
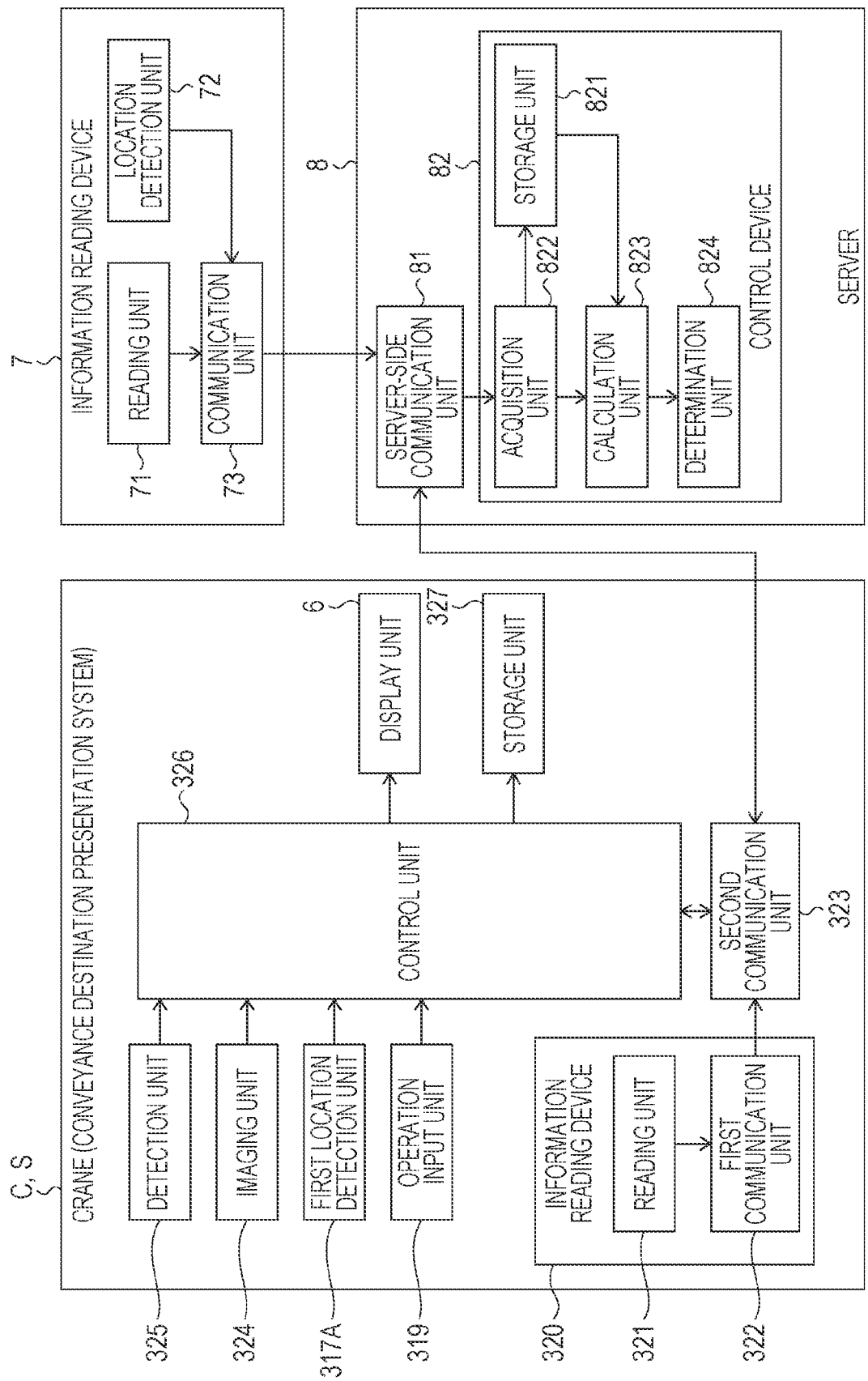
FIG. 2 is a block diagram illustrating a configuration of a conveyance destination presentation system.

FIG. 1 is a side view of a mobile crane (a rough terrain crane in the illustrated case) in a working state. The mobile crane is an example of a work machine.

Examples of the mobile crane include an all-terrain crane, a truck crane, and a truck loader crane (also referred to as a cargo crane). However, the crane according to the present invention is not limited to the mobile crane, and may be, for example, a tower crane. Note that the work machine is not limited to the mobile crane, and may be any kind of work machine capable of conveying a cargo.

<Mobile Crane>

As illustrated in FIG. 1, the mobile crane C includes a traveling body 1, an outrigger 2, and a turning body 3.

As an example of conveyance work performed by the mobile crane C, the mobile crane C conveys a cargo W from a conveyance source T1 (a location indicated by a small star in FIG. 1), at which the cargo W is temporarily placed, to a conveyance destination T2 (a location indicated by a large star in FIG. 1).

<Outline of Configuration of Crane>

The mobile crane C according to the present embodiment acquires information (e.g., coordinates) pertaining to a location of the conveyance destination T2 from an information storage unit 5 provided in the cargo W using an information reading unit (an information reading device 320) provided in a hook device 312. In addition, the mobile crane C calculates information pertaining to an operation of the crane for conveying the cargo W to the conveyance destination T2. Then, the acquired information pertaining to the location and the calculated information pertaining to the operation of the crane are displayed on a display unit 6. Hereinafter, a specific configuration of the mobile crane C will be described.

<Traveling Body>

The traveling body 1 includes a plurality of wheels 11. The outrigger 2 is provided at each of four corners of the traveling body 1. The turning body 3 is turnably provided on an upper side of the traveling body 1.

<Turning Body>

The turning body 3 includes a turning base 301, an expandable/contractible boom 302, a boom expanding/contracting device 306, a boom raising/lowering device 308, a jib 310, a wire rope 311, and a hook device 312.

In addition, the turning body 3 includes a cab 313, a location detection unit 317A, a display unit 6, an operation input unit 319, an information reading device 320, a second communication unit 323, an imaging unit 324, a detection unit 325, a control unit 326, and a storage unit 327.

<Turning Base>

The turning base 301 is turnably supported by the traveling body 1, and is provided to turn the turning body 3.

<Expandable/Contractible Boom>

The expandable/contractible boom 302 is an example of a boom, and a proximal portion thereof is fixed to the turning base 301. The expandable/contractible boom 302 includes a plurality of boom elements. Each of the plurality of boom elements has a tubular shape. The plurality of boom elements are combined with each other in a telescopic manner.

Specifically, in a contracted state, the plurality of boom elements include a distal boom element 303, an intermediate boom element 304, and a proximal boom element 305 in order from the inside. In the present embodiment, the intermediate boom element 304 includes two intermediate boom elements. Note that the number of intermediate boom elements 304 may be one or three or more. In addition, the boom is not limited to an expandable/contractible boom, and may be a non-expandable/contractible boom.

<Boom Expanding/Contracting Device>

The boom expanding/contracting device 306 includes a hydraulic source (not illustrated), a hydraulic pump (not illustrated), a control valve (not illustrated), an expandable/contractible cylinder device 307, etc. The elements constituting the boom expanding/contracting device 306 are connected to each other by piping. Such a boom expanding/contracting device 306 expands or contracts the expandable/contractible boom 302 based on whether the expandable/contractible cylinder device 307 expands or contracts.

<Boom Raising/Lowering Device>

The boom raising/lowering device 308 includes a hydraulic source (not illustrated), a hydraulic pump (not illustrated), a control valve (not illustrated), an expandable/contractible cylinder device 309, etc. Such a boom raising/lowering device 308 raises or lowers the expandable/contractible boom 302 based on whether the expandable/contractible cylinder device 309 expands or contracts.

<Jib>

The jib 310 is connected to a distal end portion of the expandable/contractible boom 302. The wire rope 311 hangs down from a distal end portion of the jib 310.

<Hook Device>

The hook device 312 is an example of a hook, and is suspended by the wire rope 311 from the distal end portion of the jib 310.

Specifically, the hook device 312 includes a hook block 314 and a hook 315. The hook block 314 includes a sheave (not illustrated). The wire rope 311 is slung around the sheave. In the present embodiment, the number of wire ropes 311 slung is two. However, the number of wire ropes 311 slung is not limited to that in the present embodiment. The number of wire ropes wound may be one or three or more.

In the present embodiment, the expandable/contractible boom 302 and the jib 310 are examples of operable functional parts. The jib 310 may not be used depending on a work state. When the jib 310 is not used, the expandable/contractible boom 302 is an example of an operable functional part.

<Location Detection Unit>

The location detection unit 317A acquires information pertaining to its own position.

In the present embodiment, the location detection unit 317A is a GNSS antenna for receiving information from a satellite positioning system such as a global positioning system (GPS). The location detection unit 317A acquires information (coordinates) pertaining to its own location from the satellite positioning system.

In the present embodiment, the location detection unit 317A is provided at a distal end portion of an operable functional part (the jib 310 in the present embodiment). Therefore, in the present embodiment, the information pertaining to the location acquired by the location detection unit 317A (hereinafter referred to as "location information") is also information pertaining to a location of the distal end portion of the operable functional part (the jib 310 in the present embodiment).

Note that the location of the location detection unit 317A is not limited to the location in the present embodiment. The location of the location detection unit 317A is preferably a location close to the distal end portion of the operable functional part (the jib 310 in the present embodiment). In a case where the jib 310 is not used, the location detection unit 317A may be provided at the distal end portion of the boom 302.

The location detection unit 317A transmits the detected information pertaining to the location to the control unit 326.

<Display Unit>

The display unit 6 displays information and the like. The display unit 6 is provided in the cab 313. The display unit 6 is, for example, a display or a monitor. The display may be a touch panel type display.

<Operation Input Unit>

The operation input unit 319 is an example of an operation unit, and is provided in the cab 313. The operation input unit 319 includes, for example, an operation tool for operating the traveling of the mobile crane C and an operation tool for operating the mobile crane C.

The operation tool for operating the mobile crane C may include at least one operation tool, for example, among a turning operation tool (not illustrated) for operating a turning motion of the boom, a raising/lowering operation tool (not illustrated) for operating a raising/lowering motion of the boom, an expansion/contraction operation tool (not illustrated) for operating an expanding/contracting motion of the boom, and a drum operation tool (not illustrated) for operating a winch.

The operation tool for operating the mobile crane C includes, for example, a plurality of levers corresponding to the operations of the mobile crane C. A lever operation direction corresponds to a direction in which the mobile crane C operates, and a lever operation amount corresponds to a speed at which the mobile crane C operates.

The winch is a device for reeling (winding up) and unreeling (winding down) the wire rope. In the present specification, the winch may be one or both of a main winch for reeling and unreeling a wire rope by which a main hook is suspended and a sub winch for reeling and unreeling a wire rope by which a sub hook is suspended.

<Information Reading Device>

The information reading device 320 is an example of an information reading unit, and is provided in the hook device 312. The information reading device 320 includes a reading unit 321 and a first communication unit 322.

The reading unit 321 has a function of acquiring information from the information storage unit 5 (which will be described later) provided in the cargo W conveyed by the mobile crane C. The reading unit 321 is, for example, an RFID reader that reads information from an IC tag such as an RF tag. Note that the information reading device 320 may include a writing unit for writing information into the IC tag.

The reading unit 321 establishes wireless communication with the information storage unit 5 to read information stored in the information storage unit 5. The cargo W is suspended from the hook 315 via a sling wire rope 316. The reading unit 321 sends the acquired information to first communication unit 322.

The information read by the reading unit 321 is information pertaining to the cargo. The information pertaining to the cargo may include, for example, at least one kind of information among identification information about the cargo, information pertaining to a location of a conveyance source of the cargo (hereinafter referred to as "conveyance source location information about the cargo"), information pertaining to a location of a conveyance destination of the cargo (hereinafter referred to as "conveyance destination location information about the cargo"), and specification information about the cargo.

The conveyance destination location information about the cargo is, for example, coordinates of the conveyance destination of the cargo (hereinafter, simply referred to as "conveyance destination coordinates"). The conveyance destination coordinates may be local coordinates based on a predetermined location in a work site or global coordinates.

The cargo specification information may include at least one kind of information among information pertaining to a dimension of the cargo (hereinafter referred to as "cargo dimensional information"), information pertaining to a weight of the cargo (hereinafter referred to as "cargo weight information"), and information pertaining to a shape of the cargo (hereinafter referred to as "cargo shape information").

The first communication unit 322 establishes wireless communication with the second communication unit 323 (which will be described later) to transmit the information acquired from the reading unit 321 to the second communication unit 323.

A method of the wireless communication between the first communication unit 322 and the second communication unit 323 is, for example, wireless LAN such as WiFi®, Bluetooth®, near field communication (NFC), or the like.

The second communication unit 323 is provided, for example, in the cab 313. The second communication unit 323 establishes wireless communication with the first communication unit 322 to acquire information from the first communication unit 322. The second communication unit 323 transmits the acquired information to the control unit 326.

<Imaging Unit>

The imaging unit 324 is, for example, a digital camera device. The imaging unit 324 is provided at the distal end portion of the jib 310.

The imaging unit 324 is connected to the control unit 326. The imaging unit 324 and the control unit 326 may be connected to each other in a wired manner or in a wireless manner. The imaging unit 324 and the control unit 326 may be connected to each other using any known connection method.

The imaging unit 324 captures an image downwardly in the vertical direction from the distal end portion of the jib 310 under the control of the control unit 326. The imaging unit 324 captures an image around the hook device 312, including the hook device, from the distal end portion of the jib 310.

The imaging unit 324 may have any angle of view as long as it is capable of capturing an image within a predetermined range including hook device 312 from the distal end portion of the jib 310. The imaging unit 324 preferably has an angle of view capable of imaging the location of the conveyance source of the cargo W (e.g., a spot at which the cargo W is temporarily placed) and the location of the conveyance destination of the cargo W. The imaging unit 324 may be capable of changing an imaging direction under the control of the control unit 326.

Under the control of the control unit 326, the imaging unit 324 may capture an image including a route through which the cargo W passes (hereinafter referred to as "route image"), in a case where the mobile crane C has moved the cargo W from the conveyance source to the conveyance destination. The route image may be an image obtained by combining a plurality of still images together.

The imaging unit 324 generates image data and sends the generated image data to the control unit 326. The imaging unit 324 may capture images at all times from the start to the stop under the control of the control unit 326. Furthermore, the imaging unit 324 may capture an image when a predetermined condition is satisfied under the control of the control unit 326.

The imaging direction of the imaging unit 324 may be fixed downward in the vertical direction. However, the imaging direction of the imaging unit 324 may be changeable. The imaging direction of the imaging unit 324 may be controlled by the control unit 326 on the basis of an operation input from an operator. Alternatively, the imaging direction of the imaging unit 324 may be automatically controlled by the control unit 326 on the basis of the determination of the control unit 326.

\<Detection Unit\>

The detection unit 325 detects information pertaining to the mobile crane C. The information pertaining to the mobile crane C includes information pertaining to a posture of the mobile crane C. The detection unit 325 includes a plurality of sensors provided in the mobile crane C. The detection unit 325 sends the detected information pertaining to the posture to the control unit 326.

The information pertaining to the posture may include, for example, a raised/lowered angle of the boom, a length of the boom, a turning angle of the boom, a raised/lowered angle of the jib, a length of the jib, an overhanging width of the outrigger, and a suspended-down length of the wire.

Note that the information pertaining to the posture may be not only the information detected by the sensors but also information calculated on the basis of the information detected by the sensors. The information pertaining to the posture may include information required for the control unit 326 to calculate location information about the hook device 312. Therefore, the location information about the hook device 312 may be included in the information pertaining to the posture.

The information detected by the detection unit 325 may include information required for the control unit 326 to detect that the cargo has been lifted off the ground. The information required to detect that the cargo has been lifted off the ground may be, for example, information pertaining to a load acting on the wire rope 311.

Furthermore, the detection unit 325 may include information required for the control unit 326 to detect that the cargo has been completely installed. The information required to detect that the cargo has been completely installed may be, for example, information pertaining to a load acting on the wire rope 311.

\<Control Unit\>

The control unit 326 controls the operation of each of elements of the mobile crane C described above. The control unit 326 may be a circuit or a device capable of calculation.

For example, at least one of a central processing unit (CPU), a micro processing unit (MPU), and a graphics processing unit (GPU) may be used for the control unit 326. For example, the control unit 326 may be a control unit dedicated to a conveyance destination presentation system.

Furthermore, the control unit 326 may be a control device such as a safety device provided in the mobile crane C (e.g., an overload preventing device). The functions of the control unit 326 to be described below may be realized by one control unit, or may be realized by a plurality of control units in cooperation with each other.

The control unit 326 acquires information pertaining to a location of a crane (hereinafter referred to as "location information about the crane"). The control unit 326 acquires location information (coordinates) about the crane on the basis of the location information acquired from the location detection unit 317A.

Note that the location information about the crane may be information pertaining to a location of the location detection unit 317A, or may be information pertaining to a location of another portion (e.g., the turning center of the turning body 3) in the crane.

When the location information about the crane is information pertaining to the location of the turning center of the turning body 3, the control unit 326 acquires information pertaining to a location of the turning center of the boom, on the basis of the location information acquired from the location detection unit 317A, the information pertaining to the posture of the crane acquired from the detection unit 325, and specification data (e.g., information pertaining to a positional relationship between a point at which the raising/lowering of the boom is started and the turning center of the turning body) of the crane acquired from the storage unit (not illustrated).

In addition, the location information about the crane may be local coordinates based on a predetermined location in a work site or global coordinates. When the location information about the crane is local coordinates, the control unit 326 appropriately converts the location information acquired from the location detection unit 317A into local coordinates.

The control unit 326 acquires information pertaining to an orientation of the crane (hereinafter "orientation information about the crane"). The control unit 326 acquires orientation information about the crane on the basis of the location information acquired from the location detection unit 317A and the information pertaining to the posture acquired from the detection unit 325. The orientation information about the crane may be regarded as an azimuth in front of the crane.

The control unit 326 acquires conveyance destination location information about the cargo. The control unit 326 acquires information pertaining to a location of the conveyance destination of the cargo from the information reading device 320. The control unit 326 may transmit the acquired conveyance destination location information about the cargo to a server 8 to be described later.

The control unit 326 acquires information pertaining to a posture of the crane corresponding to the conveyance destination (hereinafter referred to as "posture information about the crane at the conveyance destination"). The control unit 326 calculates posture information about the crane at the conveyance destination on the basis of the location information about the crane, the orientation information about the crane, and the conveyance destination location information about the cargo.

The posture information about the crane at the conveyance destination refers to a posture of the crane in a state where the crane has conveyed the cargo to the conveyance destination. In this manner, the control unit 326 has a function of converting the location information about the crane, the orientation information about the crane, and the conveyance destination location information about the cargo into the posture information about the crane corresponding to the conveyance destination.

The control unit 326 detects that the cargo has been completely lifted off the ground. In addition, the control unit 326 determines whether the cargo has been completely lifted off the ground.

The control unit 326 determines whether or not the cargo has been completely lifted off the ground, on the basis of the information (e.g., a load acting on the wire rope 311) acquired from the detection unit 325. Specifically, when the load acting on the wire rope 311 increases and thereafter becomes constant, the control unit 326 determines that the cargo has been completely lifted off the ground.

The control unit 326 detects that the cargo has been completely installed. In addition, the control unit 326 determines whether or not the cargo has been completely installed.

The control unit 326 determines whether or not the cargo has been completely installed, on the basis of the information (e.g., a load acting on the wire rope 311) acquired from the detection unit 325. Specifically, the control unit 326 determines that the cargo has been completely installed when the load of the cargo is removed from the load acting on the wire rope 311 in a state where the cargo is suspended from the crane.

The control unit 326 determines whether or not conveyance work is possible (hereinafter referred to as "conveyance work determination"). The control unit 326 performs conveyance work determination according to the following method.

The control unit 326 acquires performance information corresponding to the posture information about the crane at the conveyance destination. The performance information refers to a maximum load of the cargo that can be hoisted when the mobile crane C is in a posture indicated by the posture information about the crane at the conveyance destination (hereinafter referred to as "posture of the crane at the conveyance destination"). Such performance information may be calculated through calculation or may be stored in advance in the storage unit.

In addition, the control unit 326 acquires weight information about the cargo from the information reading device 320. Then, the control unit 326 determines whether or not the mobile crane C is able to convey the cargo to the conveyance destination, on the basis of the acquired performance information and the acquired weight information about the cargo.

Specifically, when the acquired performance information is larger than the weight of the cargo to be conveyed, the control unit 326 determines that the mobile crane C is able to convey the cargo to the conveyance destination. On the other hand, when the acquired performance information is smaller than the weight of the cargo to be conveyed, the control unit 326 determines that the mobile crane C is not able to convey the cargo to the conveyance destination.

The control unit 326 calculates information pertaining to the operation of the crane for conveying the cargo W to the conveyance destination (hereinafter referred to as "operation information about the crane"). The control unit 326 calculates operation information about the crane for conveying the cargo W to the conveyance destination, on the basis of the information pertaining to the cargo acquired from the information reading device 320.

The operation information about the crane includes, for example, information pertaining to a posture that can be taken by the crane when the cargo W is conveyed to the conveyance destination (hereinafter referred to as "posture information about the crane").

The posture information about the crane includes posture information about the crane when the cargo W is hoisted at the conveyance source (hereinafter referred to as "posture information about the crane corresponding to the conveyance source").

In addition, the posture information about the crane includes posture information about the crane when the cargo W is unloaded at the conveyance destination (hereinafter referred to as "posture information about the crane corresponding to the conveyance destination").

In addition, the operation information about the crane includes information pertaining to an operation amount of the operation input unit 319 (operation tool) (hereinafter referred to as "information pertaining to the operation amount of the operation tool") corresponding to the posture that can be taken by the mobile crane C when the cargo W is conveyed from the conveyance source to the conveyance destination.

The control unit 326 acquires information (e.g., coordinates) pertaining to a location of the center of gravity G (see FIG. 7) of the cargo, on the basis of the location information acquired from the location detection unit 317A and the information (e.g. a suspended-down length of the wire) acquired from the detection unit 325. Hereinafter, the information pertaining to the location of the center of gravity G of the cargo will be simply referred to as center-of-gravity location information about the cargo. The control unit 326 transmits the acquired information pertaining to the location of the center of gravity of the cargo to the server 8 to be described later.

In a case where the information reading device 320 includes a writing unit (which will be described later), the control unit 326 may control the information reading device 320 to write the acquired center-of-gravity location information about the cargo into the information storage unit 5 provided in the cargo W.

Note that a method by which the control unit 326 acquires the center-of-gravity location information about the cargo is not particularly limited. For example, the control unit 326 may acquire the center-of-gravity location information about the cargo on the basis of the location information acquired from the location detection unit 317A and the information pertaining to the posture of the mobile crane C acquired from the detection unit 325 (e.g. a raised/lowered angle of the boom, a length of the boom, a turning angle of the boom, a raised/lowered angle of the jib, a length of the jib, and a suspended-down length of the wire)

<Information Reading Device>

An information reading device 7 is operated by, for example, an operator 9 who is at the conveyance destination T2 (hereinafter referred to as "the operator 9 at the conveyance destination", see FIG. 7). Such an information reading device 7 acquires location information about itself at the time of reading information from the information storage unit 5 provided in the cargo. Then, the information reading device 7 transmits the acquired location information about itself to the server 8 to be described later.

Specifically, the information reading device 7 includes a reading unit 71, a location detection unit 72, and a communication unit 73.

<Reading Unit>

The reading unit 71 has a function of acquiring information from the information storage unit 5 provided in the cargo W. The reading unit 71 is, for example, an RFID reader that reads information from an IC tag such as an RF tag. Note that the information reading device 7 may include a writing unit for writing information into the IC tag.

The reading unit 71 establishes wireless communication with the information storage unit 5 to read information stored in the information storage unit 5 on the basis of an operation of the operator 9 at the conveyance destination.

The information read by the reading unit 71 is, for example, information pertaining to the cargo. The information pertaining to the cargo may include, for example, at least one kind of information among identification information about the cargo, conveyance source location information about the cargo, conveyance destination location information about the cargo, and specification information about the cargo. The reading unit 71 sends the acquired information to the communication unit 73. The information acquired by the reading unit 71 may be similar to the information acquired by the reading unit 321 described above.

In addition, in a case where the information storage unit 5 stores the center-of-gravity location information about the cargo, the reading unit 71 may acquire the center-of-gravity location information about the cargo from the information storage unit 5. The reading unit 71 may send the acquired center-of-gravity location information about the cargo to the communication unit 73.

<Location Detection Unit>

The location detection unit 72 is a GNSS antenna for receiving information from a satellite positioning system such as a global positioning system (GPS). The location detection unit 72 acquires information (coordinates) pertaining to its own location from the satellite positioning system.

In the present embodiment, the location detection unit 72 is incorporated in the information reading device 7. Therefore, in the present embodiment, the information pertaining to the location acquired by the location detection unit 72 is also information pertaining to a location of the location detection unit 72.

In the present embodiment, the location detection unit 72 acquires information pertaining to its own location according to the operation of the reading unit 71. Specifically, the location detection unit 72 acquires information pertaining to its own location at a timing when the reading unit 71 reads information from the information storage unit 5.

When the information reading device 7 reads the information from the information storage unit 5, the operator 9 at the conveyance destination brings the information reading device 7 close to the information storage unit 5.

Therefore, at the timing when the reading unit 71 reads the information from the information storage unit 5, the information pertaining to the location of the location detection unit 72 is also location information about the information storage unit 5 (that is, a portion of the cargo where the information storage unit 5 is provided). The portion of the cargo where the information storage unit 5 is provided is an example of a first section in the cargo. The first section of the cargo is a portion located at a different location from the center of gravity of the cargo. Specifically, the first section of the cargo is a portion located at a different location from the center of gravity of the cargo in a longitudinal direction of the cargo.

The portion of the cargo where the information storage unit 5 is provided is an example of a first section of the cargo. Hereinafter, location information about the information storage unit 5 (the portion of the cargo where the information storage unit 5 is provided) will be referred to as location information about the first section of the cargo.

The first section of the cargo is located out of the location of the center of gravity of the cargo. The first section of the cargo is preferably one end of opposite ends in the longitudinal direction of the cargo. In addition, the first section of the cargo is preferably a portion whose direction in an installed state is predetermined.

<Communication Unit>

The communication unit 73 establishes communication with a server-side communication unit 81 to send the information (the location information about the first section of the cargo) acquired from the location detection unit 72 to the server-side communication unit 81.

In addition, when the center-of-gravity location information about the cargo has been acquired from the reading unit 71, the communication unit 73 may send the acquired center-of-gravity location information about the cargo to the server-side communication unit 81.

The communication unit 73 and the server-side communication unit 81 are communicably connected to each other, for example, via a network such as the Internet. A method of connection between the communication unit 73 and server-side communication unit 81 is not particularly limited. For example, the method of connection between the communication unit 73 and the server-side communication unit 81 may be wireless LAN such as WiFi®, Bluetooth®, or the like.

<Server>

The server 8 is an example of a terminal, and is communicably connected to the mobile crane C and/or the information reading device 7 via a network such as the Internet.

Such a server 8 acquires information pertaining to the location of the center of gravity of the cargo hung by the mobile crane C and information pertaining to the location of the information storage unit 5 provided in the cargo. Then, the server 8 calculates information pertaining to an orientation of the cargo on the basis of the acquired information pertaining to the location of the center of gravity of the cargo and the acquired location information about the first section of the cargo. Hereinafter, a specific configuration of the server 8 will be described.

The server 8 includes a server-side communication unit 81 and a control device 82.

<Server-Side Communication Unit>

The server-side communication unit 81 establishes communication with the second communication unit 323 of the mobile crane C and/or the communication unit 73 of the information reading device 7 to receive information from the mobile crane C and the information reading device 7. The server-side communication unit 81 may transmit information to the mobile crane C and/or the information reading device 7.

The server-side communication unit 81 is communicably connected to the second communication unit 323 of the mobile crane C and the communication unit 73 of the information reading device 7 via a network.

Specifically, the server-side communication unit 81 acquires the center-of-gravity location information about the cargo from the second communication unit 323 of the mobile crane C. Then, the server-side communication unit 81 sends the acquired center-of-gravity location information about the cargo to the control device 82.

Note that the server-side communication unit 81 may acquire the center-of-gravity location information about the cargo from the information reading device 7. Alternatively, the server-side communication unit 81 may acquire the center-of-gravity location information about the cargo from a device other than the mobile crane C and the information reading device 7.

In addition, the server-side communication unit 81 acquires the location information about the first section of the cargo from the communication unit 73 of the information reading device 7. Then, the server-side communication unit 81 sends the acquired location information about the first section of the cargo to the control device 82.

Note that the server-side communication unit 81 may acquire the location information about the first section of the cargo from a device other than the information reading device 7.

Further, the server-side communication unit 81 may acquire information pertaining to the cargo (e.g., identification information about the cargo) from the second communication unit 323 of the mobile crane C or the communication unit 73 of the information reading device 7.

<Control Device>

The control device 82 includes a storage unit 821, an acquisition unit 822, a calculation unit 823, and a determination unit 824.

<Storage Unit>

The storage unit 821 stores information. Specifically, the storage unit 821 stores information (e.g., coordinates) pertaining to a planned location at which the cargo is to be installed in association with the identification information about the cargo.

The information pertaining to the planned location at which the cargo is to be installed is information determined in advance, for example, by an application such as building information modeling (BIM). Hereinafter, the information pertaining to the planned location at which the cargo is to be installed will be simply referred to as planned installation location information.

In addition, the storage unit 821 stores information (e.g., coordinates) pertaining to a planned direction in which the cargo is to be installed in association with the identification information about the cargo.

The information pertaining to the planned direction in which the cargo is to be installed is information determined in advance, for example, by an application such as building information modeling (BIM). Hereinafter, the information pertaining to the information pertaining to the planned direction in which the cargo is to be installed will be simply referred to as planned installation direction information.

The planned installation direction information may be, for example, an azimuth of the first section of the cargo. The planned installation direction of the cargo may be, for example, an azimuth of the first section with respect to the location of the center of gravity of the cargo.

When the determination unit 824 to be described later determines that the cargo is placed at a correct installation location and determines that the cargo is oriented in a correct installation direction, the storage unit 821 stores the center-of-gravity location information about the cargo and the direction information about the cargo (to be described later) as a log.

<Acquisition Unit>

The acquisition unit 822 acquires the center-of-gravity location information about the cargo via the server-side communication unit 81. In the present embodiment, the acquisition unit 822 acquires the center-of-gravity location information about the cargo from the mobile crane C. However, the acquisition unit 822 may acquire the center-of-gravity location information about the cargo from a device other than the mobile crane C (e.g., the information reading device 7).

In addition, the acquisition unit 822 acquires the location information about the first section of the cargo via the server-side communication unit 81. In the present embodiment, the acquisition unit 822 acquires the location information about the first section of the cargo from the information reading device 7. Such an acquisition unit 822 is an example of a first acquisition unit and a second acquisition unit.

Then, the acquisition unit 822 sends the acquired center-of-gravity location information about the cargo and the acquired location information about the first section of the cargo to the calculation unit 823.

<Calculation Unit>

The calculation unit 823 calculates information pertaining to a direction of the cargo (hereinafter simply referred to as "direction information about the cargo") on the basis of the center-of-gravity location information about the cargo and the location information about the first section of the cargo acquired from the acquisition unit 822.

The direction information about the cargo may be regarded as information pertaining to an azimuth of the first section of the cargo with respect to the location of the center of gravity of the cargo. The calculation unit 823 sends the calculated direction information about the cargo to the determination unit 824.

<Determination Unit>

The determination unit 824 determines whether or not the cargo is oriented in a correct installation direction on the basis of the direction information about the cargo acquired from the calculation unit 823 and the planned installation direction information acquired from the storage unit 821.

In addition, the determination unit 824 determines whether or not the cargo is placed at a correct installation location on the basis of the center-of-gravity location information about the cargo acquired from the acquisition unit 822 or the calculation unit 823 and the information pertaining to the planned location at which the cargo is to be installed acquired from the storage unit 821.

Alternatively, the determination unit 824 may determine whether or not the cargo is placed at a correct installation location (conveyance destination) on the basis of the conveyance destination location information about the cargo acquired from the mobile crane C or the information reading device 7 and the center-of-gravity location information about the cargo acquired from the acquisition unit 822 or the calculation unit 823.

Note that the determination unit 824 performs the determination, for example, in a state where the cargo is hung by the mobile crane C while the cargo has been conveyed to the vicinity of the planned installation location. In this state, the center-of-gravity location information about the cargo is slightly different from the planned installation location information acquired from the storage unit 821.

Therefore, when a difference between the location (coordinates) of the center of gravity of the cargo and the planned installation location (coordinates) of the cargo is within a predetermined range, the determination unit 824 may determine that the cargo is placed at a correct installation location. In addition, when a difference between the location (coordinates) of the center of gravity of the cargo and the conveyance destination location information (coordinates) about the cargo is within a predetermined range, the determination unit 824 may determine that the cargo is placed at a correct conveyance destination.

<Conveyance Destination Presentation Process>

Figure 5:
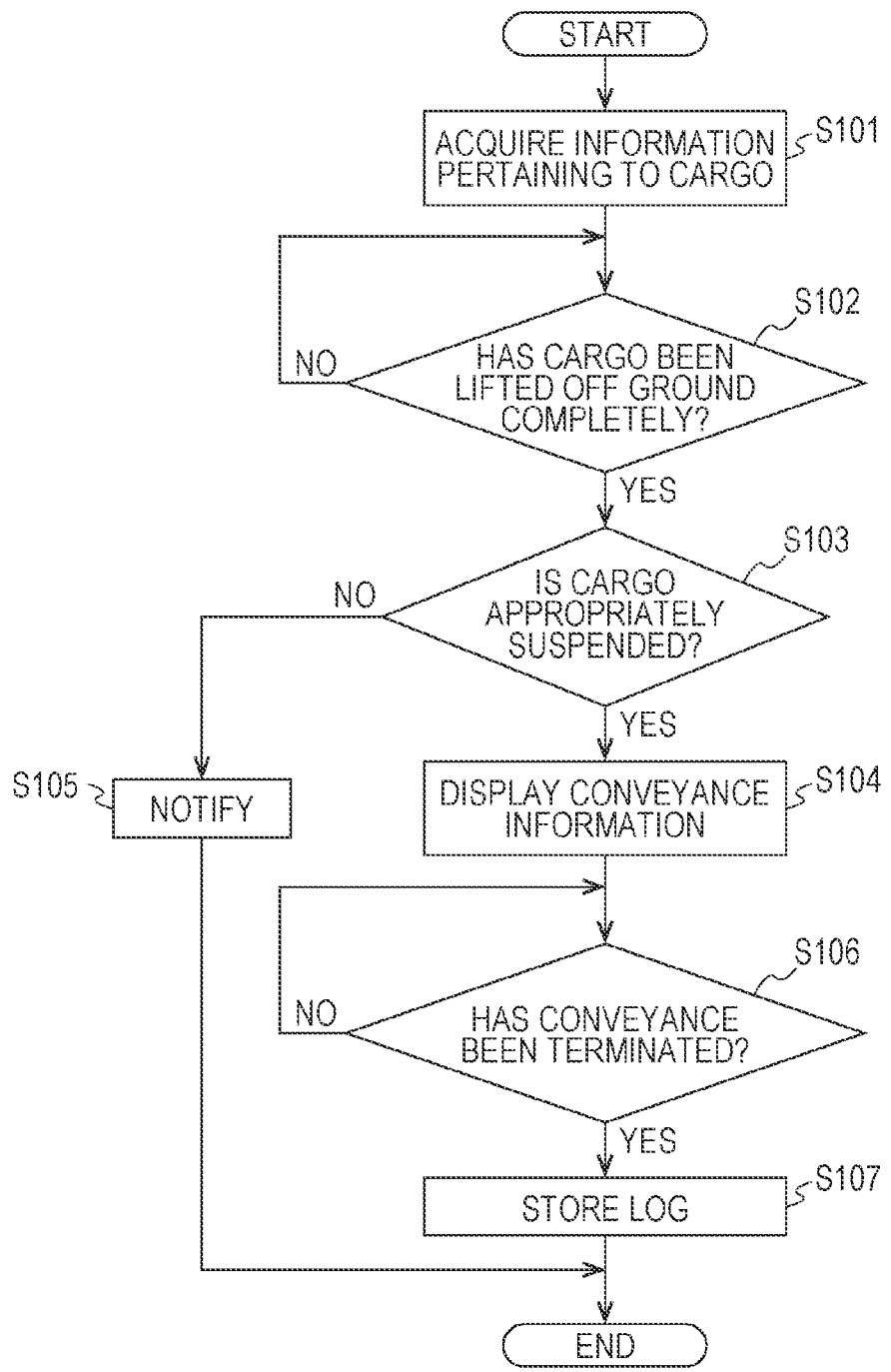
FIG. 5 is a flowchart of a conveyance destination presentation process performed by the crane.

Hereinafter, a conveyance destination presentation process (conveyance destination presentation method) performed by the mobile crane C in the conveyance work of the mobile crane C will be described with reference to FIGS. 1 and 5. FIG. 5 is a flowchart of a conveyance destination presentation process. The flowchart illustrated in FIG. 5 illustrates a conveyance destination presentation process performed in the mobile crane C when the mobile crane C conveys a cargo W from a conveyance source to a conveyance destination.

The conveyance destination presentation process illustrated in FIG. 5 is realized by a conveyance destination presentation system S included in the mobile crane C. The conveyance destination presentation process is realized by a plurality of elements included in the mobile crane C in cooperation with each other. The operation of each element may be autonomously performed by each element, or may be performed by each element under the control of the control unit 326.

In the following description, the conveyance work performed by the mobile crane C is, for example, work of conveying a cargo W from a conveyance source T1 (a location indicated by a small star in FIG. 1) to a conveyance destination T2 (a location indicated by a large star in FIG. 1) as illustrated in FIG. 1.

FIG. 1 illustrates a mobile crane C disposed around a building B. The mobile crane C illustrated in FIG. 1 hoists a cargo W to a predetermined height. The conveyance destination presentation process is performed, for example, during a period from a time when sling work is performed by a sling operator to a time when the cargo W is completely lifted off the ground.

First, the operator operates the operation input unit 319 to move the hook device 312 to be located above the cargo W placed at the conveyance source T1. Note that the operation of moving the hook device 312 to be located above the cargo W may be automatically performed by the control unit 326.

In addition, the sling operator places a sling wire rope 316 around the cargo W at an appropriate timing.

In step S101 of FIG. 5, the information reading device 320 acquires information pertaining to the cargo W from the information storage unit 5 provided in the cargo. Then, the information reading device 320 sends the acquired information pertaining to the cargo to the control unit 326. The timing at which the conveyance destination presentation process is started may be a time point at which the information reading device 320 acquires the information pertaining to the cargo from the information storage unit 5.

The information pertaining to the cargo acquired by the information reading device 320 in the step S101 may include, for example, at least one kind of information among identification information about the cargo, conveyance source location information about the cargo, conveyance destination location information about the cargo, and specification information about the cargo.

In the step S101, the information reading device 320 may acquire any information pertaining to the cargo as long as it is used in each step of control processing in the present operation example.

The information storage unit 5 stores information pertaining to the cargo corresponding to the cargo W to which the information storage unit 5 is attached. The information storage unit 5 may be, for example, an IC tag, a barcode, or a QR code®.

In a case where the information storage unit 5 is an IC tag, the information storage unit 5 may be, for example, a passive IC tag in which a battery is not mounted while a radio wave or the like from the information reading device 320 is used as a power source, or an active IC tag in which a battery is mounted.

In addition, a communication method and a frequency band to be used between the information reading device 320 and the information storage unit 5 are not particularly limited. Furthermore, the information storage unit 5 may be, for example, a read-only IC tag that is dedicated to reading information and cannot write information, or a read/write IC tag that can read and write information.

The conveyance destination location information about the cargo stored in the information reading device 320 may include, for example, a latitude, a longitude, and a height of the conveyance destination of the cargo W. The conveyance source location information about the cargo stored in the information reading device 320 may include, for example, a latitude, a longitude, and a height of the conveyance source of the cargo W.

In step S102 of FIG. 5, the control unit 326 determines whether or not the cargo has been completely lifted off the ground. The control unit 326 determines whether or not the cargo has been completely lifted off the ground, on the basis of the information (e.g., a load acting on the wire rope 311) acquired from the detection unit 325.

In step S102 of FIG. 5, the control unit 326 determines that the cargo has been completely lifted off the ground, for example, when a load acting on the wire rope 311 increases and thereafter becomes constant. Note that the method of determining whether the cargo has been lifted off the ground is not limited thereto.

When it is determined that the cargo has been completely lifted off the ground ("YES" in the step S102), the control unit 326 shifts the control processing to step S103.

When it is determined that the cargo has not been completely lifted off the ground ("NO" in the step S102), the control unit 326 repeatedly executes the control processing of the step S102.

In the step S103 of FIG. 5, the control unit 326 determines whether or not the cargo is appropriate. Specifically, the control unit 326 determines whether or not the cargo suspended from the mobile crane C (hereinafter referred to as "hoisted cargo") is a cargo corresponding to the information pertaining to the cargo acquired from the information reading device 320 (hereinafter referred to as "cargo planned to be hoisted").

In the step S103, the control unit 326 calculates weight information about the cargo suspended from the mobile crane C, on the basis of a load acting on the wire rope 311 after the cargo is completely lifted off the ground. Then, the control unit 326 determines whether or not the calculated weight information about the cargo matches the weight information about the cargo acquired from the information reading device 320 (including an error within a predetermined range).

When the calculated weight information about the cargo matches the weight information about the cargo acquired from the information reading device 320 (including an error within a predetermined range), the control unit 326 determines that the hoisted cargo corresponds to the cargo planned to be hoisted.

When it is determined that the hoisted cargo corresponds to the cargo planned to be hoisted ("YES" in the step S103), the control unit 326 shifts the control processing to step S104.

On the other hand, when the calculated information pertaining to the weight of the cargo does not match the weight information about the cargo acquired from the information reading device 320, the control unit 326 determines that the suspended cargo does not correspond to the cargo planned to be hoisted.

When it is determined that the suspended cargo does not correspond to the cargo planned to be hoisted ("NO" in the step S103), the control unit 326 shifts the control processing to step S105.

In the step S104, the control unit 326 controls the display unit 6 to display conveyance information. The conveyance information includes, for example, conveyance destination location information about the cargo and operation information about the crane.

The control unit 326 controls the display unit 6 to display the conveyance information in such a manner as to be superimposed on an image displayed on the display unit 6 (hereinafter referred to as "base image").

In a case where the base image is an image captured by the imaging unit 324, the control unit 326 generates a composite image obtained by combining the conveyance information with the image (base image) acquired from the imaging unit 324. Then, the control unit 326 controls the display unit 6 to display the composite image.

The base image is not limited to an image captured by the imaging unit 324. For example, the base image may be an image generated by an image generation application such as building information modeling (BIM).

The base image may be an image captured by an imaging device other than the imaging unit 324. Preferably, the imaging device is provided around the mobile crane C and capable of imaging the mobile crane C, the location of the conveyance source of the cargo W, and the location of the conveyance destination of the cargo W.

Example of Image to Be Displayed

Figure 3:
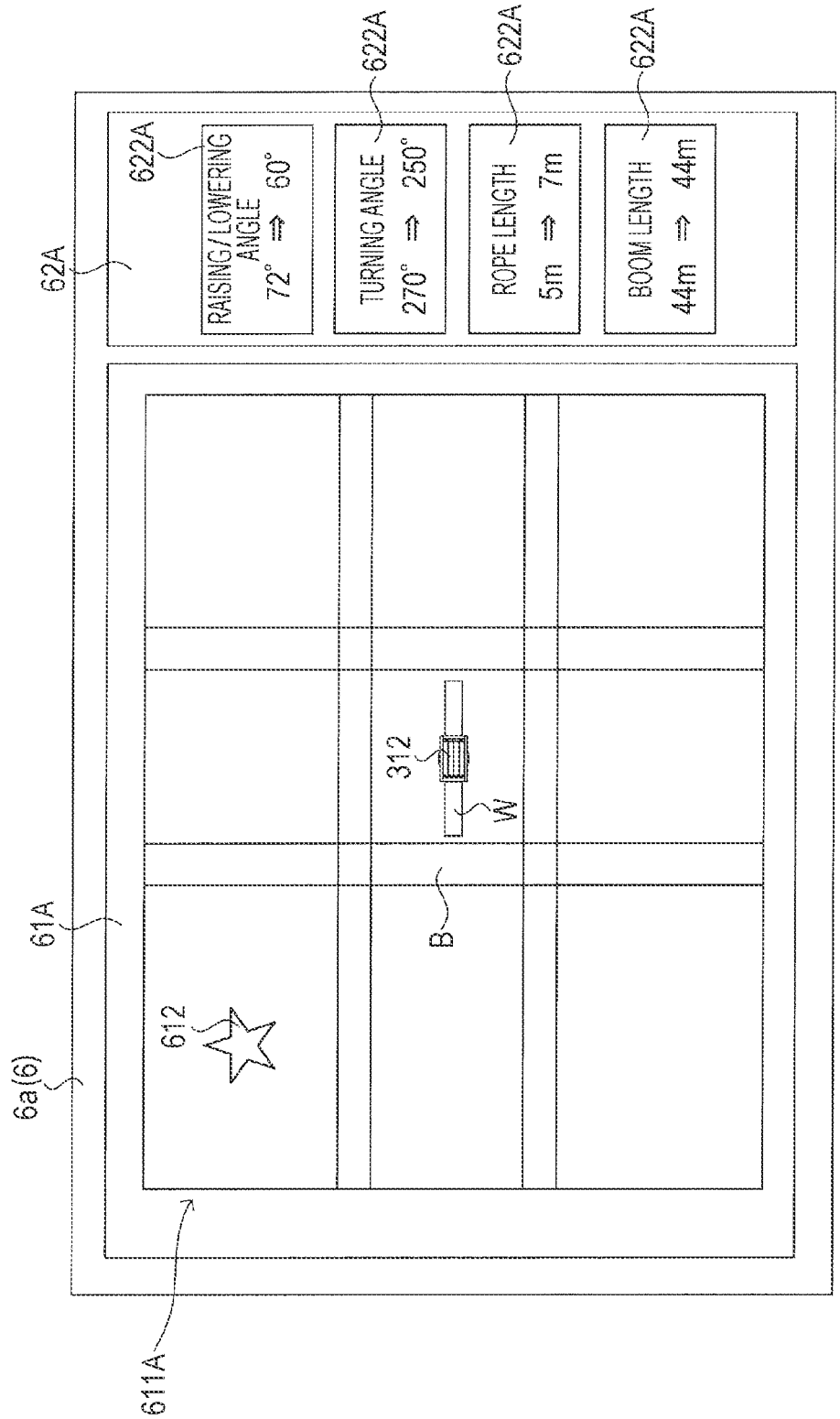
FIG. 3 is a diagram illustrating an example of an image displayed on a display unit.

Here, an example of an image (composite image) to be displayed on the display unit 6 will be described. FIG. 3 illustrates an example of an image generated by the control unit 326 and displayed on the display unit 6.

In the present example, a screen 6a of the display unit 6 is divided into a first area 61A and a second area 62A. In the present example, the second area 62A is provided on the right side of the first area 61A on the screen 6a.

In the first area 61A, a first image 611A is displayed. The first image 611A includes a capture image (base image) captured by the imaging unit 324 and a conveyance destination image 612 indicating the location of the conveyance destination T2 in the capture image. The first image 611A is a composite image obtained by combining the conveyance destination image 612 with the capture image (base image) captured by the imaging unit 324. The conveyance destination image 612 is an example of the information pertaining to the location of the conveyance destination.

A second image 622A is displayed in the second area 62A. The second image 622A includes an image indicating the posture information about the crane (hereinafter referred to as "posture information image").

The posture information image is an example of information pertaining to an operation.

The posture information image includes an image of information pertaining to a raising/lowering angle (hereinafter referred to as "raising/lowering angle image"), an image of information pertaining to a turning angle (hereinafter referred to as "turning angle image"), an image of information pertaining to a rope length (hereinafter referred to as "rope length image"), and an image indicating information pertaining to a boom length (hereinafter referred to as "boom length image").

The posture information image includes posture information corresponding to the conveyance source and posture information corresponding to the conveyance destination for each posture. The posture information corresponding to the conveyance source is posture information about the crane at the time when the cargo is hoisted at the conveyance source. The posture information corresponding to the conveyance destination is posture information about the crane at the time when the cargo has been conveyed to the conveyance destination.

Specifically, the raising/lowering angle image includes an image pertaining to a raising/lowering angle corresponding to the conveyance source and an image pertaining to a raising/lowering angle corresponding to the conveyance destination. In the present example, a value displayed on the left side of the raising/lowering angle image ("72°" in the present example) is a raising/lowering angle corresponding to the conveyance source. In addition, a value displayed on the right side of the raising/lowering angle image ("60°" in the present example) is a raising/lowering angle corresponding to the conveyance destination.

Also, the turning angle image includes an image pertaining to a turning angle corresponding to the conveyance source and an image pertaining to a turning angle corresponding to the conveyance destination. In the present example, a value displayed on the left side of the turning angle image ("270°" in the present example) is a turning angle corresponding to the conveyance source. In addition, a value displayed on the right side of the turning angle image ("250°" in the present example) is a turning angle corresponding to the conveyance destination.

Also, the rope length image includes an image pertaining to a rope length corresponding to the conveyance source and an image pertaining to a rope length corresponding to the conveyance destination. In the present example, a value displayed on the left side of the rope length image ("5 m" in the present example) is a rope length corresponding to the conveyance source. In addition, a value displayed on the right side of the rope length image ("7 m" in the present example) is a rope length corresponding to the conveyance destination.

Also, the boom length image includes an image pertaining to a boom length corresponding to the conveyance source and an image pertaining to a boom length corresponding to the conveyance destination. In the present example, a value displayed on the left side of the boom length image ("44 m" in the present example) is a boom length corresponding to the conveyance source. In addition, a value displayed on the right side of the boom length image ("44 m" in the present example) is a boom length corresponding to the conveyance destination.

The first image 611A and the second image 622A as described above are composite images obtained by combining the operation information (posture information image and conveyance destination image) about the crane with the base image. The first image 611A and the second image 622A are continuously displayed on the display unit 6 during the conveyance work.

The control unit 326 may display the posture information image in a display mode in which an operator can recognize an operation order (hereinafter referred to as "operation priority") when the cargo is conveyed from the conveyance source to the conveyance destination.

Specifically, the control unit 326 may change the color of the posture information in the posture information image in accordance with the operation priority. In the present example, if the posture information image is displayed in four colors, the operator can recognize the operation priority based on the colors. Note that, in a case where the operations have the same priority, the posture information image may be displayed in one color.

Alternatively, the control unit 326 may display posture information corresponding to an operation having a higher priority on a higher side of the posture information image. In the posture information image illustrated in FIG. 3, an operation of changing the raising/lowering angle, an operation of changing the turning angle, an operation of changing the rope length, and an operation of changing the boom length are sequentially displayed in terms of priority in descending order.

Furthermore, the control unit 326 may display the posture information image in a display mode in which the operator can recognize posture information that has reached the posture information corresponding to the conveyance destination. For example, the control unit 326 may display the posture information image in such a manner that a color (e.g., red) indicating posture information that has reached the posture information (target posture) corresponding to the conveyance destination is different from a color (e.g., white) indicating posture information that has not reached the posture information (target posture) corresponding to the conveyance destination.

Example of Image to Be Displayed

Figure 4:
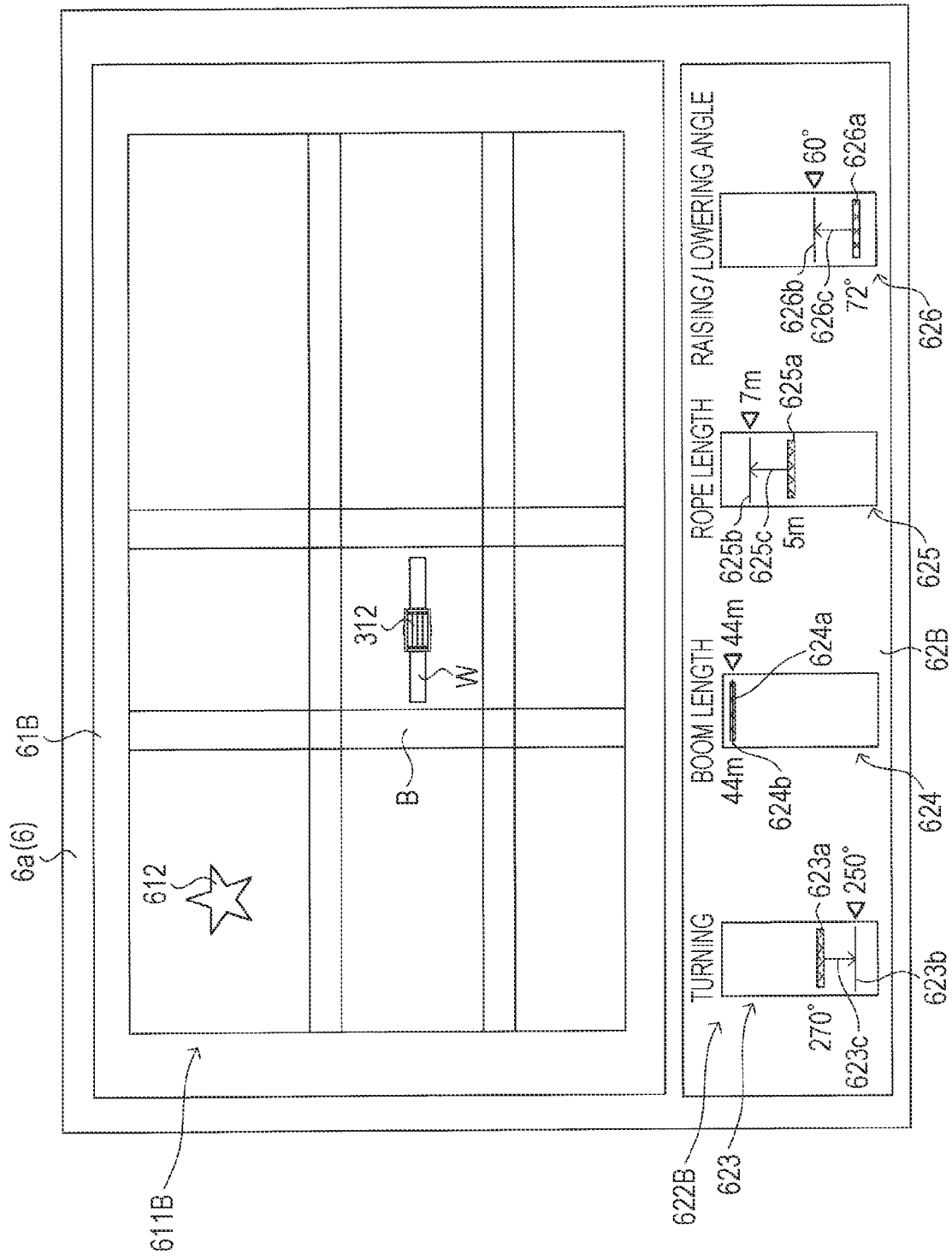
FIG. 4 is a diagram illustrating an example of an image displayed on a display unit.

An example of an image to be displayed on the display unit 6 will be described. FIG. 4 illustrates an example of an image generated by the control unit 326 and displayed on the display unit 6.

In the present example, a screen 6a of the display unit 6 is divided into a first area 61B and a second area 62B. In the present example, the second area 62B is provided below the first area 61B on the screen 6a.

In the first area 61B, a first image 611B is displayed. The first image 611B includes a capture image captured by the imaging unit 324 and a conveyance destination image 612 indicating the location of the conveyance destination T2 in the capture image.

In the second area 62B, a second image 622B is displayed. The second image 622B includes an image indicating the posture information about the crane (hereinafter referred to as "posture information image").

The posture information image includes an image pertaining to a raising/lowering angle, an image pertaining to a turning angle, an image pertaining to a rope length, and an image pertaining to a boom length.

The posture information image includes posture information corresponding to the conveyance source and posture information corresponding to the conveyance destination for each posture. The posture information corresponding to the conveyance source is posture information about the crane at the time when the cargo is hoisted at the conveyance source. The posture information corresponding to the conveyance destination is posture information about the crane at the time when the cargo has been conveyed to the conveyance destination.

In addition, the posture information image includes an image imitating the operation input unit 319 (hereinafter referred to as "operation unit simulating image"). In the present example, the operation unit simulating image includes images imitating operation levers constituting the operation input unit 319.

The posture information image has a form in which an operator can recognize an operation direction and an operation amount of an operation lever to be operated at the time when the cargo is conveyed from the conveyance source to the conveyance destination. The posture information image includes an image indicating a location of an operation lever corresponding to the conveyance source, an image indicating a location of an operation lever corresponding to the conveyance destination, and an image indicating a direction of an operation lever to be operated by an operator.

The image indicating the location of the operation lever corresponding to the conveyance source, the image indicating the location of the operation lever corresponding to the conveyance destination, and the image indicating the direction of the operation lever to be operated by the operator are examples of the information pertaining to the operation amount of the operation unit and the information pertaining to the operation direction of the operation unit.

In the present example, the second image 622B includes an image pertaining to a turning angle, an image pertaining to a boom length, an image pertaining to a rope length, and an image pertaining to a raising/lowering angle in order from the left.

Specifically, the image pertaining to the turning angle includes an operation lever simulating image 623 imitating a turning operation lever (hereinafter referred to as "turning lever"), an image pertaining to a turning angle corresponding to the conveyance source, and an image pertaining to a turning angle corresponding to the conveyance destination.

The operation lever simulating image 623 includes a conveyance source lever location image 623a indicating a location of a turning lever corresponding to the conveyance source, a conveyance destination lever location image 623b indicating a location of a turning lever corresponding to the conveyance destination, and an operation direction image 623c indicating an operation direction of a turning lever to be operated by an operator.

In the present example, a value displayed on the left side of the operation lever simulating image 623 ("270°" in the present example) is a turning angle corresponding to the conveyance source. In addition, a value displayed on the right side of the turning angle image ("250°" in the present example) is a turning angle corresponding to the conveyance destination.

The image pertaining to the boom length includes an operation lever simulating image 624 imitating an expanding/contracting operation lever (hereinafter referred to as "expanding/contracting lever"), an image pertaining to a boom length corresponding to the conveyance source, and an image pertaining to a boom length corresponding to the conveyance destination.

The operation lever simulating image 624 includes a conveyance source lever location image 624a indicating a location of an expanding/contracting lever corresponding to the conveyance source, a conveyance destination lever location image 624b indicating a location of an expanding/contracting lever corresponding to the conveyance destination, and an operation direction image (not illustrated) indicating an operation direction of an expanding/contracting lever to be operated by an operator.

Note that, in the present example, since the location of the expanding/contracting lever corresponding to the conveyance source is the same as the location of the expanding/contracting lever corresponding to the conveyance destination, the operator does not operate the expanding/contracting lever. Accordingly, an operation direction image indicating an operation direction of the expanding/contracting lever is omitted.

In the present example, a value displayed on the left side of the operation lever simulating image 624 ("44 m" in the present example) is a boom length corresponding to the conveyance source. In addition, a value displayed on the right side of the boom length image ("44 m" in the present example) is a boom length corresponding to the conveyance destination.

The image pertaining to the rope length includes an operation lever simulating image 625 imitating a winching operation lever (hereinafter referred to as "winching lever"), an image pertaining to a rope length corresponding to the conveyance source, and an image pertaining to a rope length corresponding to the conveyance destination.

The operation lever simulating image 625 includes a conveyance source lever location image 625a indicating a location of a winching lever corresponding to the conveyance source, a conveyance destination lever location image 625b indicating a location of a winching lever corresponding to the conveyance destination, and an operation direction image 625c indicating an operation direction of a winching lever to be operated by an operator.

In the present example, a value displayed on the left side of the operation lever simulating image 625 ("5 m" in the present example) is a rope length corresponding to the conveyance source. In addition, a value displayed on the right side of the rope length image ("7 m" in the present example) is a rope length corresponding to the conveyance destination.

The image pertaining to the raising/lowering angle includes an operation lever simulating image 626 imitating a raising/lowering operation lever (hereinafter referred to as "raising/lowering lever"), an image pertaining to a raising/lowering angle corresponding to the conveyance source, and an image pertaining to a raising/lowering angle corresponding to the conveyance destination.

The operation lever simulating image 626 includes a conveyance source lever location image 626*a* indicating a location of a raising/lowering lever corresponding to the conveyance source, a conveyance destination lever location image 626*b* indicating a location of a raising/lowering lever corresponding to the conveyance destination, and an operation direction image 626*c* indicating an operation direction of a raising/lowering lever to be operated by an operator.

In the present example, a value displayed on the left side of the operation lever simulating image 626 ("7°" in the present example) is a raising/lowering angle corresponding to the conveyance source. In addition, a value displayed on the right side of the raising/lowering angle image ("60°" in the present example) is a raising/lowering angle corresponding to the conveyance destination.

In the present example as well, the first image 611E and the second image 622B are continuously displayed on the display unit 6 during the conveyance work. The control unit 326 may display the posture information image in a display mode in which an operator can recognize an operation order (hereinafter referred to as "operation priority") when the cargo is conveyed from the conveyance source to the conveyance destination.

Specifically, the control unit 326 may change the color of the posture information in the posture information image in accordance with the operation priority. In the present example, if the posture information image is displayed in four colors, the operator can recognize the operation priority based on the colors. Note that, in a case where the operations have the same priority, the posture information image may be displayed in one color.

Alternatively, the control unit 326 may display posture information corresponding to an operation having a higher priority on a more leftward side of the posture information image. In the posture information image illustrated in FIG. 4, an operation of changing the turning angle, an operation of changing the boom length, an operation of changing the rope length, and an operation of changing the raising/lowering angle are sequentially displayed in terms of priority in descending order.

Furthermore, the control unit 326 may display the posture information image in a display mode in which the operator can recognize posture information that has reached the posture information corresponding to the conveyance destination. For example, the control unit 326 may display the posture information image in such a manner that a color (e.g., red) indicating posture information that has reached the posture information (target posture) corresponding to the conveyance destination is different from a color (e.g., white) indicating posture information that has not reached the posture information (target posture) corresponding to the conveyance destination.

Here, the description returns to the flowchart of FIG. 5. In the step S105 of FIG. 5, the control unit 326 notifies that the cargo is not appropriately hoisted. For example, the control unit 326 controls the display unit 6 to display that the cargo is not appropriately hoisted. Then, the control unit 326 ends the conveyance location presentation process.

In step S106 of FIG. 5, the control unit 326 determines whether or not the conveyance of the cargo W has been completed. The state in which the conveyance of the cargo W is completed may be regarded as a state in which the cargo W is conveyed to the conveyance destination and the cargo W is removed from the hook device 312.

The control unit 326 calculates a location of the cargo W hooked to the hook device 312, and determines that the cargo W has been conveyed to the conveyance destination when the calculated location of the cargo W matches a location corresponding to location information about the conveyance destination.

In addition, the control unit 326 determines that the cargo W has been placed at a predetermined location of the conveyance destination on the basis of information acquired from the detection unit 325 (e.g., a load acting on the wire rope 311).

When it is determined that the conveyance of the cargo W has been completed (the installation of the cargo W has been completed) ("YES" in the step S106), the control unit 326 shifts the control processing to step S107.

When it is determined that the conveyance of the cargo W has not been completed ("NO" in the step S106), the control unit 326 repeats the control processing of the step S106.

In step S107 of FIG. 5, the control unit 326 generates a log of the terminated conveyance work and stores the log in the storage unit 327.

The log of the conveyance work includes, for example, a work date, information pertaining to the cargo, a conveyance work start time, and a conveyance work end time.

The information pertaining to the cargo included in the log of the conveyance work may include, for example, at least one kind of information among identification information about the cargo, conveyance source location information about the cargo, conveyance destination location information about the cargo, and specification information about the cargo.

The log of the conveyance work may include information about the crane that has performed the conveyance work. The information about the crane The log of the conveyance work may include information about a posture of the crane during the conveyance work. The information about the posture of the crane included in the log of the conveyance work may include posture information about the crane at the conveyance source and/or posture information about the crane at the conveyance destination.

The log of the conveyance work may include a result of determination as to conveyance work performed by the control unit 326. Note that when the result of determination as to conveyance work is "conveyance impossible", the conveyance work is not performed. In this case, the log of the conveyance work includes, for example, a work date, information pertaining to the cargo, and information pertaining to the crane. The information pertaining to the crane may include identification information about the crane.

In the step S107 of FIG. 5, the control unit 326 may also control the writing unit (not illustrated) of the information reading device 320 to store coordinates of the center of gravity of the cargo W at the time when the conveyance of the cargo W is completed (the installation of the cargo W is completed) in the information storage unit 5 provided in the cargo W. The control unit 326 calculates the coordinates of the center of gravity of the cargo W on the basis of the posture information about the crane corresponding to the conveyance destination. Such coordinates of the center of gravity of the cargo W are used for managing work progress control.

Then, the control unit 326 ends the conveyance destination presentation process.

<Cargo Direction Calculation Process>

Figure 6:
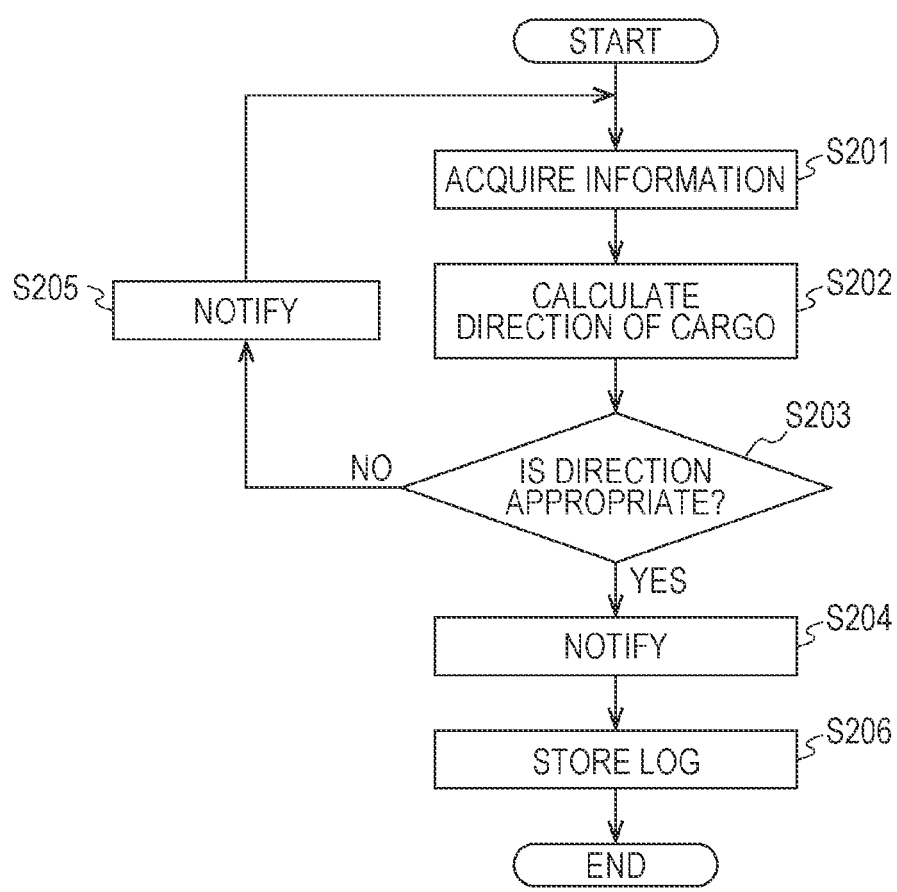
FIG. 6 is a flowchart of a cargo direction calculation process.

Next, a cargo direction calculation process according to the present embodiment will be described with reference to FIGS. 6 and 7. FIG. 6 is a flowchart of a cargo direction calculation process.

Figure 7:
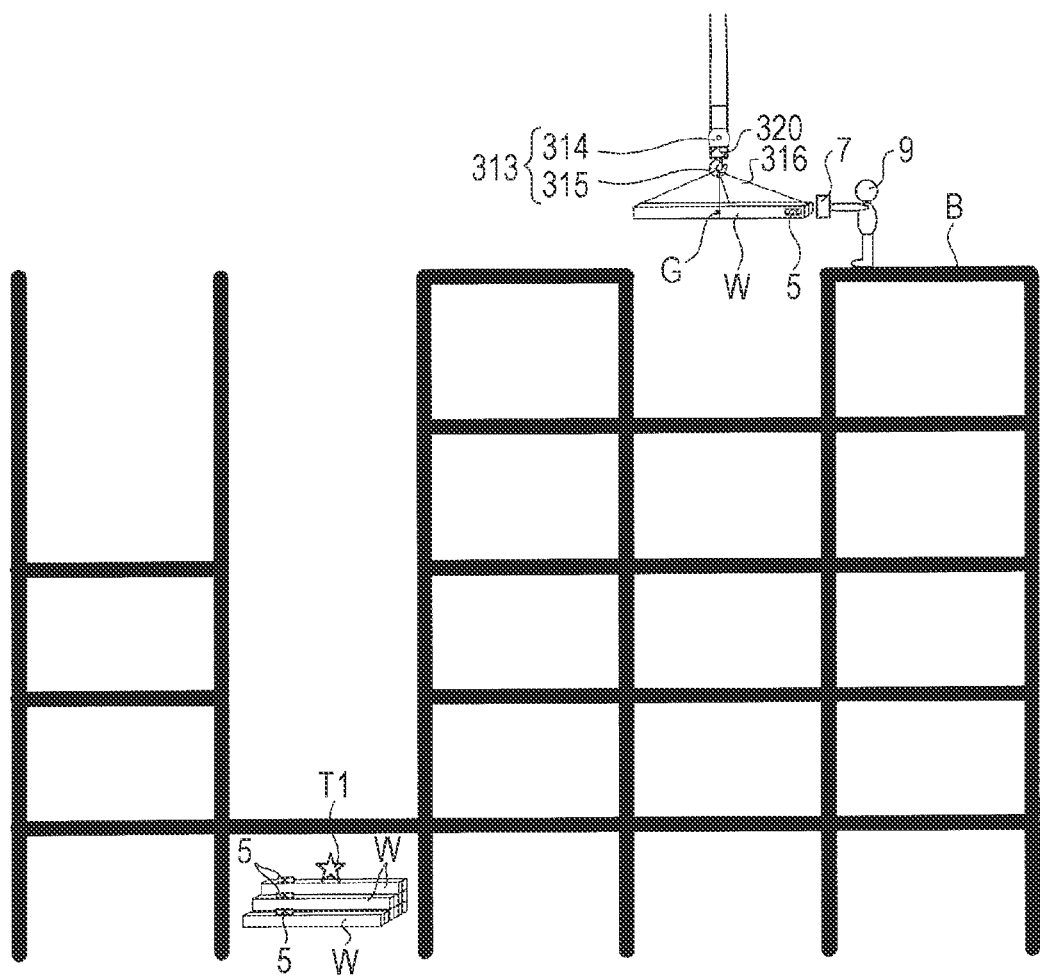
FIG. 7 is a schematic diagram illustrating a state of a work site where the cargo direction calculation process is performed.

The cargo direction calculation process is performed, for example, in a state where the conveyance of the cargo W has been completed in the above-described conveyance destination presentation process (see FIG. 7). In other words, the cargo direction calculation process is performed in a state where the cargo is located at the conveyance destination. Note that the cargo direction calculation process can be performed independently of the conveyance destination presentation process.

In addition, some of the control processing in the cargo direction calculation process illustrated in FIG. 7 may be appropriately omitted. In addition, a control processing order in the cargo direction calculation process illustrated in FIG. 7 may be changed unless technically contradictory.

First, in step S201 of FIG. 6, the control device 82 (specifically, the acquisition unit 822) of the server 8 acquires the center-of-gravity location information about the cargo hung by the mobile crane C and the location information about the first section of the cargo. Thereafter, the control device 82 shifts the control processing to step S202.

In the case of the present example, the control device 82 acquires the center-of-gravity location information (e.g., coordinates) about the cargo from the mobile crane C. In addition, the control device 82 acquires the location information (e.g., coordinates) about the first section of the cargo from the information reading device 7.

The location information about the first section of the cargo is information acquired by the information reading device 7 based on an operation of the operator 9 at the conveyance destination. As described above, the location information about the first section of the cargo corresponds to the location information about the portion of the cargo where the information storage unit 5 is provided.

Next, in step S202 of FIG. 6, the control device 82 (specifically, the calculation unit 823) calculates direction information about the cargo on the basis of the acquired center-of-gravity location information (e.g., coordinates) about the cargo and the acquired location information (e.g., coordinates) about the first section of the cargo. Thereafter, the control device 82 shifts the control processing to step S203.

Next, in step S203 of FIG. 6, the control device 82 (specifically, the determination unit 824) determines whether or not the cargo is oriented in a correct installation direction on the basis of the calculated direction information about the cargo and the planned installation direction information acquired from the storage unit 821.

When it is determined in the step S203 that the cargo is oriented in a correct installation direction ("YES" in the step S203), the control device 82 shifts the control processing to step S204.

When it is determined in the step S203 that the cargo is not oriented in a correct installation direction ("NO" in the step S203), the control device 82 shifts the control processing to step S205.

Note that, in the step S203, the control device 82 (specifically, the determination unit 824) may additionally determine whether or not the cargo is placed at a correct installation location on the basis of the acquired center-of-gravity location information about the cargo and the planned installation location information acquired from the storage unit 821.

Alternatively, in the step S203, the control device 82 (specifically, the determination unit 824) may additionally determine whether or not the cargo is placed at a correct installation location on the basis of the acquired center-of-gravity location information about the cargo and the conveyance destination location information about the cargo acquired from the mobile crane C or the information reading device 7.

In the step S204 of FIG. 6, the control device 82 notifies that the cargo is oriented in a correct installation direction. In the step S204, the control device 82 may transmit information indicating that the cargo is oriented in a correct installation direction to the mobile crane C. The mobile crane C may notify a crane operator of information indicating that the cargo is oriented in a correct installation direction by displaying the information on the display unit 6.

In the step S204, the control device 82 may transmit information indicating that the cargo is oriented in a correct installation direction to the information reading device 7. The information reading device 7 may notify the operator 9 at the conveyance destination of information indicating that the cargo is oriented in a correct installation direction by displaying the information on a display unit (not illustrated) of the information reading device 7. Thereafter, the control device 82 shifts the control processing to step S206.

When the control device 82 (specifically, the determination unit 824) determines in the step S203 that the cargo is placed at a correct installation location, the control device 82 notifies in the step S204 that the cargo is placed at a correct installation location.

In the step S204, the control device 82 may transmit information indicating that the cargo is placed at a correct installation location to the mobile crane C. The mobile crane C may notify a crane operator of information indicating that the cargo is placed at a correct installation location by displaying the information on the display unit 6.

In the step S204, the control device 82 may transmit information indicating that the cargo is placed at a correct installation location to the information reading device 7. The information reading device 7 may notify the operator 9 at the conveyance destination of information indicating that the cargo is placed at a correct installation location by displaying the information on a display unit (not illustrated) of the information reading device 7.

Upon recognizing that the cargo is oriented in a correct installation direction and/or that the cargo is placed at a correct installation location, the operator 9 at the conveyance destination can proceed with work for installing the cargo.

In the step S205 of FIG. 6, the control device 82 notifies that the cargo is not oriented in a correct installation direction. In the step S205, the control device 82 may transmit information indicating that the cargo is not oriented in a correct installation direction to the mobile crane C. The mobile crane C may notify a crane operator of information indicating that the cargo is not oriented in a correct installation direction by displaying the information on the display unit 6.

In the step S205, the control device 82 may transmit information indicating that the cargo is not oriented in a correct installation direction to the information reading device 7. The information reading device 7 may notify the operator 9 at the conveyance destination by displaying the information indicating that the cargo is not oriented in a correct installation direction on a display unit (not illustrated).

When the control device 82 (specifically, the determination unit 824) determines in the step S203 that the cargo is not placed at a correct installation location, the control device 82 notifies in the step S205 that the cargo is not placed at a correct installation location. In the step S205, the control device 82 may transmit information indicating that the cargo is not placed at a correct installation location to the mobile crane C. The mobile crane C may notify a crane operator of information indicating that the cargo is not placed at a correct installation location by displaying the information on the display unit 6.

When the control device 82 (specifically, the determination unit 824) determines in the step S203 that the cargo is not placed at a correct installation location, the control device 82 may also transmit information indicating that the cargo is not placed at a correct installation location to the information reading device 7 in the step S205. The information reading device 7 may notify the operator 9 at the conveyance destination of information indicating that the cargo is not placed at a correct installation location by displaying the information on a display unit (not illustrated) of the information reading device 7.

Upon recognizing that the cargo is not oriented in a correct installation direction and/or that the cargo is not placed at a correct installation location, the crane operator and the operator 9 at the conveyance destination can proceed with installation work after performing work of changing the direction of the cargo to the correct direction and/or work of changing the location of the cargo to the correct installation location.

Next, in the step S206 of FIG. 6, after the installation is completed, the control device 82 stores the center-of-gravity location information about the cargo and the direction information about the cargo in the storage unit 821 as a log.

Note that the control device 82 may acquire information indicating that the installation has been completed from the mobile crane C. Alternatively, the control device 82 may determine that the installation has been completed on the basis of the information acquired from the mobile crane C (e.g., information pertaining to a load acting on the wire rope 311).

Then, the control device 82 ends the cargo direction calculation process.

<Effect of Present Embodiment>

In the present embodiment having the above-described configuration, the server 8 (specifically, the calculation unit 823) has a function of calculating direction information about the cargo on the basis of the acquired center-of-gravity location information about the cargo and the acquired location information about the first section of the cargo. Therefore, the crane operator and/or the operator at the conveyance destination can know the direction of the cargo conveyed by the mobile crane C.

In addition, the server 8 (specifically, the determination unit 824) has a function of determining whether or not the cargo is oriented in a correct installation direction on the basis of the acquired direction information about the cargo and the acquired planned installation direction information. Therefore, the crane operator and/or the work vehicle at the conveyance destination can know whether or not the cargo is oriented in a correct installation direction by checking a determination result.

In addition, the server 8 (specifically, the determination unit 824) has a function of determining whether or not the cargo is placed at a correct installation location on the basis of the acquired center-of-gravity location information about the cargo and the acquired information pertaining to the planned location at which the cargo is to be installed. Therefore, the crane operator and/or the work vehicle at the conveyance destination can know whether or not the cargo is placed at a correct installation location by checking a determination result.

According to the present embodiment, work efficiency can also be improved. That is, in the present embodiment, the information reading device 320 provided in the hook device 312 acquires the conveyance destination location information about the cargo from the information storage unit 5 provided in the cargo W. Then, the conveyance destination location information acquired by the information reading device 320 is displayed on the display unit 6. The operator can know the conveyance destination of the cargo by viewing the conveyance destination location information displayed on the display unit 6.

In the present embodiment, a sling operator can perform sling work without performing the work of reading the conveyance destination location information from the information storage unit 5 provided in the cargo W. Therefore, conveyance work efficiency can be improved.

In the present embodiment, the log of the conveyance work is also stored in the storage unit 327. Such a log can be used for managing an amount of the work completed. Note that the mobile crane C may acquire conveyance destination location information about another cargo from an information storage unit 5 provided in a cargo other than the cargo conveyed by itself (hereinafter referred to as "another cargo") through the information reading device 320.

When the conveyance destination location information about another cargo is acquired, the control unit 326 of the mobile crane C may estimate information pertaining to a location of another cargo (hereinafter referred to as "estimated location information about another cargo"), for example, on the basis of the detection value of the location detection unit 317A.

Then, the control unit 326 may store the conveyance destination location information about another cargo in association with the estimated location information about another cargo in the storage unit 327.

In addition, when coordinates of the center of gravity of another cargo are stored in an information storage unit 5 provided in another cargo, the mobile crane C may acquire the coordinates of the center of gravity of another cargo from the information storage unit 5 provided in the cargo through the information reading device 320. Then, the control unit 326 may store the conveyance destination location information about another cargo in association with the coordinates of the center of gravity of another cargo in the storage unit 327.

For example, it is possible to determine whether or not another cargo is installed at the conveyance destination by comparing the conveyance destination location information about another cargo with the estimated location information about another other cargo or the coordinates of the center of gravity of another cargo using a system for managing an amount of the work completed such as a server. Even if a comparison reference location is deviated from the location of the conveyance destination of another cargo, when the deviation is within a predetermined range, the system for managing an amount of the work completed may determine that another cargo is installed at the conveyance destination.

The entire disclosure of the specification, drawings, and abstract included in Japanese Patent Application No. 2020-40141 filed on Mar. 9, 2020 is incorporated herein by reference.

INDUSTRIAL APPLICABILITY

The present invention is not limited to a crane, and can be applied to various types of work machines.

The invention claimed is:

1. A control device comprising:
   a first acquisition unit that acquires information pertaining to a location of a center of gravity of a cargo conveyed by a work machine;
   a second acquisition unit that acquires information pertaining to a location of a first section different from the location of the center of gravity of the cargo; and
   a calculation unit that calculates information pertaining to a direction of the cargo on the basis of the information pertaining to the location of the center of gravity of the cargo and the information pertaining to the location of the first section.

2. The control device according to claim 1, wherein the first acquisition unit acquires the information pertaining to the location of the center of gravity of the cargo from the work machine.

3. The control device according to claim 1, wherein the second acquisition unit acquires the information pertaining to the location of the first section from an information reading device that reads information from an information storage unit provided in the first section, and
   the information pertaining to the location of the first section is information pertaining to a location of the information reading device at the time when the information reading device reads information from the information storage unit.

4. The control device according to claim 1, further comprising:
   a storage unit that stores information pertaining to a planned location at which the cargo is to be installed in association with identification information about the cargo; and
   a determination unit that determines whether or not the cargo is placed at a correct installation location on the basis of the information pertaining to the location of the center of gravity of the cargo and the information pertaining to the planned location at which the cargo is to be installed.

5. The control device according to claim 1, further comprising:
   a storage unit that stores information pertaining to a planned direction in which the cargo is to be installed in association with identification information about the cargo; and
   a determination unit that determines whether or not the cargo is oriented in a correct installation direction on the basis of the information pertaining to the direction of the cargo and the information pertaining to the planned direction in which the cargo is to be installed.

6. A terminal with the control device according to claim 1 mounted thereon.

7. A calculation method performed in a terminal including a control device, the calculation method comprising:
   acquiring information pertaining to a location of a center of gravity of a cargo conveyed by a work machine;
   acquiring information pertaining to a location of a first section different from the location of the center of gravity of the cargo; and
   calculating information pertaining to a direction of the cargo on the basis of the information pertaining to the location of the center of gravity of the cargo and the information pertaining to the location of the first section.

* * * * *